United States Patent
Pinhas et al.

(10) Patent No.: US 8,355,533 B2
(45) Date of Patent: Jan. 15, 2013

(54) METHOD FOR PROVIDING PHOTOGRAPHED IMAGE-RELATED INFORMATION TO USER, AND MOBILE SYSTEM THEREFOR

(75) Inventors: Adi Pinhas, Hod Hasharon (IL); Michael Chertok, Petach Tikva (IL)

(73) Assignee: Superfish Ltd., Petah Tikva (IL)

( * ) Notice: Subject to any disclaimer, the term of this patent is extended or adjusted under 35 U.S.C. 154(b) by 599 days.

(21) Appl. No.: 12/529,825

(22) PCT Filed: Mar. 4, 2008

(86) PCT No.: PCT/IL2008/000276
§ 371 (c)(1), (2), (4) Date: Feb. 10, 2010

(87) PCT Pub. No.: WO2008/107876
PCT Pub. Date: Sep. 12, 2008

(65) Prior Publication Data
US 2010/0142758 A1    Jun. 10, 2010

Related U.S. Application Data

(60) Provisional application No. 60/893,034, filed on Mar. 5, 2007.

(51) Int. Cl.
*G06K 9/00* (2006.01)
(52) U.S. Cl. .................................................. 382/103
(58) Field of Classification Search .......... 382/100–107; 348/308–311; 345/582–585
See application file for complete search history.

(56) References Cited

U.S. PATENT DOCUMENTS

| 2002/0145709 A1 | 10/2002 | Shibasaki et al. |
| 2003/0201996 A1* | 10/2003 | Rowe ............................ 345/582 |
| 2009/0323121 A1* | 12/2009 | Valkenburg et al. .......... 358/1.18 |

FOREIGN PATENT DOCUMENTS

| WO | WO-/03/001435 A1 | 1/2003 |
| WO | WO-/2004/038613 A1 | 5/2004 |
| WO | WO-/2005/114476 A1 | 12/2005 |

OTHER PUBLICATIONS

International Search Report for PCT/IL2008/00276 dated Jul. 21, 2008.
Written Opinion for PCT/IL2008/00276.

* cited by examiner

*Primary Examiner* — Atiba O Fitzpatrick
(74) *Attorney, Agent, or Firm* — Goodwin Procter LLP

(57) ABSTRACT

System for providing a mobile user, object related information related to an object visible thereto, the system including a camera directable toward the object, a local interest points and semi global geometry (LIPSGG) extraction processor, and a remote LIPSGG identifier, the camera acquiring an image of at least a portion of the object, the LIPSGG extraction processor being coupled with the camera, the LIPSGG extraction processor extracting an LIPSGG model of the object from the image, remote LIPSGG identifier being coupled with the LIPSGG extraction processor via a network, the remote LIPSGG identifier receiving the LIPSGG model from the LIPSGG extraction processor, via the network, the remote LIPSGG identifier identifying the object according to the LIPSGG model, the remote LIPSGG identifier retrieving the object related information, the remote LIPSGG identifier providing the object related information to the mobile user operating the camera.

16 Claims, 4 Drawing Sheets

METHOD FOR PROVIDING PHOTOGRAPHED IMAGE-RELATED INFORMATION TO USER, AND MOBILE SYSTEM THEREFOR

CROSS-REFERENCE TO RELATED APPLICATIONS

This application is the national phase of International (PCT) Patent Application Serial No. PCT/IL2008/000276, filed on Mar. 4, 2008, published under PCT Article 21(2) in English, which claims priority to and the benefit of U.S. Provisional Patent Application No. 60/893,034, filed on Mar. 5, 2007, the disclosure of each of which is incorporated herein by reference.

FIELD OF THE DISCLOSED TECHNIQUE

The disclosed technique relates to wireless communication systems in general, and to methods and systems for providing a mobile user, information related to an object, in particular.

BACKGROUND OF THE DISCLOSED TECHNIQUE

A user is often interested to obtain information related to an object, while she is physically located in front of the object. For example, the user is interested to obtain information related to a consumer product (e.g., technical specification, comparable prices, user manual concerning to a refrigerator), while she is examining the refrigerator in a department store.

Systems and methods for providing the user information related to an object, according to an image of the object are known in the art. Such a system includes a mobile station, such as a cellular phone, a personal digital assistant (PDA), or a digital camera, and a server which are connected together via a wireless network. The mobile station acquires the image of the object and sends the image to the server. The server retrieves the relevant information from a database connected thereto, according to the image, and sends the relevant information to the mobile station.

Object identification methods (i.e., the identification of an object, by a processor, according to an image of the object) are also known in the art. Generally, the user captures a digital image of an object. A processor is determining values for a set of predetermined parameters of the image, such as contrast, color and the like. The processor compares the values of the parameters to a plurality of sets of values, relating to a plurality of objects, stored in a database and determines the best match.

Reference is now made to FIG. 1, which is a schematic illustration of a system generally referenced 50, for providing information related to an object, according to an image of the object, constructed and operative as known in the art. System 50 includes a cellular phone 52, a communication interface 54, an image processor 56 and a database 58. Cellular phone 52 is coupled with communication interface 54 via a network 60. Image processor 56 is coupled with communication interface 54 and with database 58. Network 60 is a cellular communication network. Database 58 includes information (e.g., technical specification, user manual) related to each of a plurality of objects (not shown), such as an object 64. Object 64 is a consumer product, such as an MP3 player (i.e., motion picture expert group layer 3 player).

Cellular phone 52 includes a camera (not shown). Cellular phone 52 acquires an image 62 of object 64, via the camera. Cellular phone 52 sends image 62 to image processor 56, via network 60. Image processor 56 identifies object 64 according to image 62, and according to the data stored in database 58. Image processor 56 retrieves the information from database 58, and sends this information to cellular phone 52 via communication interface 54.

U.S. Pat. No. 7,016,532 B2 issued to Boncyk et al., and entitled "Image Capture and Identification System and Process", is directed to an image identification system for receiving a digital image, identifying the object in the image and transmitting a response associated with the identified object. The system includes a digital camera and a server.

A user captures an image of an object by employing the digital camera. The user transmits the captured image from the digital camera to the server via a cable or via a wireless communication network. The server identifies the object of the captured image by employing an identification algorithm. The identification algorithm includes two modules.

A first module identifies recognizable symbols such as letters, numerals, and barcodes. After identifying the recognizable symbols the server searches a database to find a match for the identified symbols. A second module decomposes the captured image into quantifiable parameters and then the server searches the database for a match for the quantifiable parameters. The server compares a match value respective of each of the first module and the second module, and chooses the best match as the identified object. The server transmits a URL associated with the identified object to the digital camera.

US Patent Application Publication No. 2005/0185060 A1 to Neven, SR., and entitled "Image Based Inquiry System for Search Engines for Mobile Telephones with Integrated Camera", is directed to an image based inquiry system for receiving information regarding an image of an object captured by a cellular phone camera. The system includes the cellular phone equipped with a digital camera and a server. A user captures the image of the object (e.g., a street sign, an automobile, an electric product). The cellular phone transmits the captured image to the server. The server identifies the object according to the captured image. The server converts the image information into symbolic information, for example plain text. The server operates a search engine by employing the symbolic information. The server transmits to the cellular phone a list of links to database entries containing information about the object.

US Patent Application Publication No. 2005/0261990 A1 to Gocht et al., and entitled "Mobile Query System and Method Based on Visual Cues", is directed to a query system for mobile query based on visual cues. The system includes a mobile phone equipped with a camera and a mobile query service. The camera of the mobile phone captures an image of a visual cue (e.g., text, graphics). The mobile phone sends the captured image to the mobile query service via a mobile network. The mobile query service identifies the user, according to the phone number of the mobile phone, and identifies the visual cue. The mobile query service formats a query according to the identified object and the user information. The mobile query service finds the user preferences, if they exist (i.e., if the user is registered with the mobile query service), and adds them to the query. The mobile query service sends a response related to the query, to the mobile phone. A plurality of affiliates provides a response to the mobile query service (e.g., media outlets, advertisers, retailers). The mobile query service sends the response to the mobile phone, to an Email address of the mobile phone or to both.

A report entitled "A Picture is Worth a Thousand Keywords: Image-Based Object Search on a Mobile Platform", presented in conference on human factors in computing systems, Portland, Or, April 2005, is directed to a system for mobile web search using object appearance. The system includes a mobile phone, a remote database and a remote processor. The remote processor is coupled with the remote database. The cellular phone is coupled with the remote processor via a cellular network. The remote database includes images of a plurality of objects, and information related to the objects. A user captures a first image of an object which he intends to query.

The user captures a second image. The second image is taken from the same perspective of the first image. The second image lacks the object of interest (i.e., the second image is different from the first image by the lack of the object of interest). The user transmits the first and the second images to the remote processor via the cellular network. The remote processor compares the first image with the second image, in order to segment the object of interest (i.e., by comparing the first image with the second image, the processor finds the boundaries of the object of interest, since the object of interest is the difference between the first image and the second image). The remote processor compares the segmented object of interest with a plurality of images, of the objects stored on the remote database, and identifies the object of interest. The remote processor retrieves information related to the object of interest, from the remote database and transmits this information to the cellular phone.

U.S. Pat. No. 6,512,919 B2 issued to Ogasawara, and entitled "Electronic Shopping System Utilizing a Program Downloadable Wireless Videophone", is directed to an electronic system which facilitates purchase transactions via a wireless videophone. The electronic shopping system includes a server and a mobile videophone. The videophone is integrally equipped with a camera. When a user, equipped with a videophone, enters a store, the user dials a number of the shopping service of that store. A shopping system application is automatically downloaded into the videophone of the user.

The user acquires an image of the barcode of a desired product. The shopping system application transmits the image of the barcode to the shopping system server. The shopping system server identifies the barcode, in the image of the barcode, employing pattern recognition. The shopping system server identifies the desired product. The shopping system server transmits to the videophone of the user, the price and the item description relating to the desired product. The shopping system enables the user to purchase the desired product through the videophone.

U.S. Pat. No. 6,595,417 B2 issued to O'Hagan et al., and entitled "Electronic Shopping System", is directed to an electronic system for use by customers in a retail shopping environment. The electronic system includes a host computer and a portable terminal. The portable terminal is located within a retail environment and interacts with the host computer to access product information. The host computer includes a product database, a host computer communication interface and a host computer processor. The portable terminal includes a barcode scanner, a display, a terminal processor and a terminal communication interface. The portable terminal can be attached to a shopping cart.

A user enters a retail environment (e.g., a large store) and takes a shopping cart, equipped with a portable terminal. The user finds a desired product and employs the barcode scanner of the portable terminal to scan the barcode, of the desired product. The portable terminal transmits identification data related to the desired product, to the host computer, according to the barcode of the desired product. The host computer retrieves information related to the desired product from a product database (e.g., the price of the product, the availability of the product in the inventory of the store, consumer information related to the desired product, and the like). The portable terminal displays to the user, the information related to the desired product.

SUMMARY OF THE DISCLOSED TECHNIQUE

It is an object of the disclosed technique to provide a novel method and system for providing a mobile user, object related information related to an object visible thereto, which overcomes the disadvantages of the prior art.

In accordance with the disclosed technique, there is thus provided a system for providing a mobile user, object related information related to an object visible thereto. The system includes a camera, a local interest points and semi global geometry (LIPSGG) extraction processor, and a remote LIPSGG identifier. The camera is coupled with the LIPSGG extraction processor. The LIPSGG extraction processor is coupled with the remote LIPSGG identifier, via a network.

The camera is directable toward the object. The camera acquires an image of at least a portion of the object. The LIPSGG extraction processor extracts an LIPSGG model of the object from the image. The remote LIPSGG identifier receives the LIPSGG model from the LIPSGG extraction processor, via the network. The remote LIPSGG identifier identifies the object, according to the LIPSGG model, and retrieves the object related information. The remote LIPSGG identifier provides the object related information to the mobile user operating the camera.

In accordance with another aspect of the disclosed technique, there is thus provided a system for providing a mobile user, object related information related to an object visible thereto. The system includes a camera, a local interest points and semi global geometry (LIPSGG) extraction processor, and a mobile communication interface. The camera is coupled with the LIPSGG extraction processor. The LIPSGG extraction processor is coupled with the mobile communication interface.

The camera is directable toward the object. The camera acquires an image of at least a portion of the object. The LIPSGG extraction processor extracts an LIPSGG model of the object from the image. The mobile communication interface transmits the LIPSGG model to a remote LIPSGG identifier via a network. The mobile communication interface receives the object related information from the remote LIPSGG identifier.

In accordance with a further aspect of the disclosed technique, there is thus provided a system for providing a mobile user, object related information related to an object visible thereto. The system includes a remote local interest points and semi global geometry (LIPSGG) identifier. The remote LIPSGG identifier includes a remote LIPSGG identifier communication interface, and an LIPSGG extraction processor.

The remote LIPSGG identifier communication interface receives an image of at least a portion of the object. The remote LIPSGG identifier receives an image of at least a portion of the object. The LIPSGG extraction processor extracts an LIPSGG model from the image. The remote LIPSGG identifier identifies the object, according to the LIPSGG model, and retrieves the object related information. The remote LIPSGG identifier communication interface transmits the object related information to the mobile user via a network.

In accordance with another aspect of the disclosed technique, there is thus provided a method for providing a mobile user, object related information related to an object visible thereto. The method includes the procedures of extracting an LIPSGG model of the object, from an image of at least a portion of the object, and transmitting LIPSGG model data respective of the LIPSGG model to an LIPSGG identifier, via a network. The method further includes the procedures of identifying the object according to the LIPSGG model data, retrieving the object related information respective of the object from a database, and transmitting the object related information to the mobile user, via the network.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
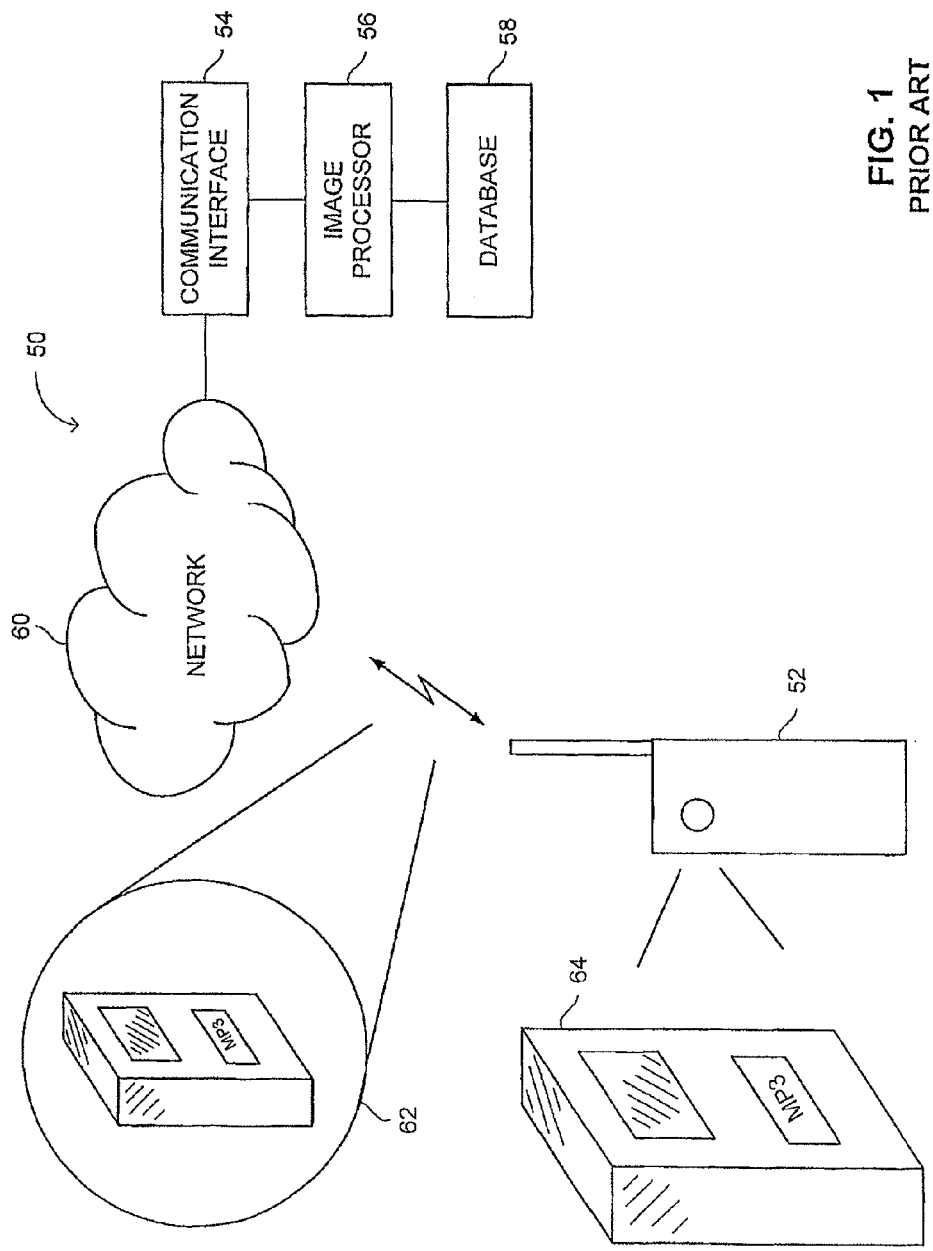
FIG. 1, is a schematic illustration of a system, for providing information related to an object, according to an image of the object, constructed and operative as known in the art.

The disclosed technique overcomes the disadvantages of the prior art by transmitting general information related to an object, to a mobile station, according to features in an image of the object, acquired by the mobile station. The mobile station acquires the image of the object, identifies points in the image, which correspond to sharp variations in values of pixels and identifies the relative position of such points in the image. The mobile station transmits the data respective of these points and their relative position in the image to a remote processor. The remote processor identifies the object according to these points and their relative position, retrieves the general information from a database, and transmits the data respective of the general information, to the mobile station. Additionally, the remote processor can retrieve the general information according to the location of the object, determined by a global positioning system (GPS) receiver, incorporated with the mobile station.

The term "camera" herein below refers to an image acquisition device. The camera can record the image digitally (e.g., by employing a charge-coupled device—CCD, complementary metal oxide semiconductor—CMOS), light-sensitive material (e.g., black and white film, color film), and the like. The camera can either be a still camera (i.e., a camera acquiring still images of an object) or a video camera. The term "object" herein below refers to a solid object, such as a consumer product, street sign, electric appliance, automobile, art piece, wine bottle, and the like.

It is noted that different elements within the solid object can be arranged in more than one configuration (i.e., the object is a multiple configuration object). For example, a car has a first configuration with closed doors, and a second configuration with open doors. Another example of a solid object with more than one configuration is a folding cellular phone, with a first configuration of a folded folding cellular phone, and a second configuration of an open folding cellular phone. However, the elements of the solid object maintain their form, in each of the configurations.

The term "network" herein below refers to either a wireless communication network, or a wired communication network. The network can include links such as Wi-Fi, WiMax, Zigbee, Bluetooth, cellular, free air optic, satellite, wired internet, wireless Internet, and the like. It is noted, that different types of data can be transferred via the network, such as Multimedia Messaging Service (MMS), Short Messaging Service (SMS), audio, video, HyperText Markup Language (HTML), Extended Markup Language (XML), Really Simple Syndication (RSS), and the like.

The term "local interest point" herein below, refers to a point in an image of an object, where there are sharp variations in pixel values, due to physical features of the object, such as an intersection of physical elements of the object, a hole, and the like. A feature vector represents a region surrounding a local interest point, based on variation in the pixel values. The feature vector describes the appearance of the object at the region surrounding the local interest point.

The term "semi-global geometry" herein below, refers to the relative distances and relative angles between the local interest points of the object. The semi-global geometry of the object defines the relative position of each of the local interest points in relation to other local interest points of the object. In case only a portion of the object is visible in the image of the object, the semi-global geometry of the object defines the relative positions of each of the local interest points in the image of the object, in relation to other interest points in the image of the object. In case of a multiple configuration object, the semi-global geometry defines the relative positions of each of the local interest points, in each element of the object, in relation to other local interest points in the same element.

It is noted, that the relative angles and distances of the semi-global geometry are independent of scale and rotation, thereby allowing identification of the object, according to images of the object acquired from different view points, or at different scales. According to the disclosed technique, the identification process is independent of rotations in two dimensions, as well as in three dimensions (i.e., up to a predetermined angle of rotation).

It is further noted, that the relative angles and distances of the semi-global geometry are substantially constant, even in case only a portion of the object is visible in the image of the object, thereby allowing identification of the object, according to partially occluded images of the object. Relative angles and distances of the semi-global geometry of the elements of the object are independent of the configuration of the object.

Figure 2:
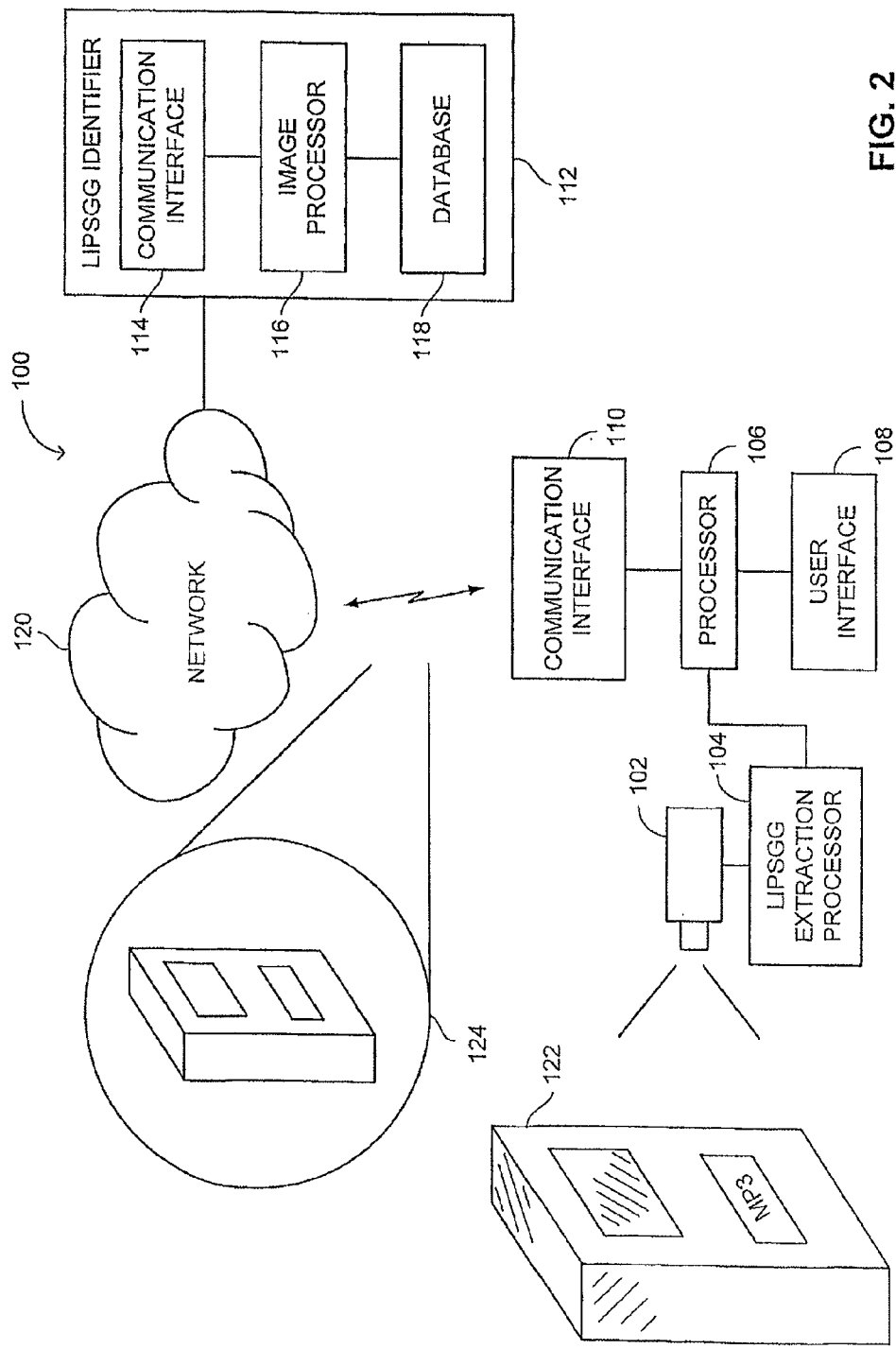
FIG. 2, is a schematic illustration of a system, for providing a mobile user, general information related to an object, constructed and operative in accordance with an embodiment of the disclosed technique.

Reference is now made to FIG. 2, which is a schematic illustration of a system generally referenced 100, for providing a mobile user, general information related to an object, constructed and operative in accordance with an embodiment of the disclosed technique. System 100 includes a camera 102, a Local Interest Points and Semi-Global Geometry (LIPSGG) extraction processor 104, a mobile processor 106, a user interface 108, a mobile communication interface 110 and an LIPSGG identifier 112. LIPSGG identifier 112 includes an LIPSGG identifier communication interface 114, an image processor 116 and a database 118.

Database 118 includes data respective of identification information related to each of a plurality of objects, and data respective of general information, related to each of the objects. The data, respective of identification information related to each of the objects, stored on database 118, is separated into models (not shown).

Each of the models corresponds to a different image of the respective object. Thus, the same object relates to several different models, corresponding to different images of the same object (e.g., a first model is derived from an image of the object from a top side of the object, and a second model is derived from an image of the object from a side view thereof). In case the object relates to more than one model, image processor 116 can reconstruct a 3D model according to the models of the object (e.g., in case the object relates to two models corresponding to two different images of the object, acquired from two different viewpoints, image processor 116 can reconstruct a stereoscopic model of the object).

Each of the models includes a plurality of feature vectors (not shown) and the semi-global geometry of the object. The feature vectors describe the variation in the pixel values in a local region surrounding each of the local interest points.

The general information, related to each of the objects, is information, which interests a mobile user, located next to one of the objects. The general information can be for example, a review about an electric appliance, a manual of an electric appliance, tourist information related to a tourist attraction, information related to an art piece in a museum, and the like.

It is noted, that database 118 can be located either on a single server, or consist of a plurality of databases (not shown) distributed in a network of servers such as the Internet. User interface 108 can be an aural device (i.e., speaker), visual device (i.e., display), tactile device (e.g., pointing device, keypad), and the like, or a combination thereof.

LIPSGG extraction processor 104 is coupled with camera 102. Mobile processor 106 is coupled with LIPSGG extraction processor 104, user interface 108 and with mobile communication interface 110. Mobile communication interface 110 is coupled with LIPSGG identifier communication interface 114 via a network 120. Image processor 116 is coupled with LIPSGG identifier communication interface 114 and with database 118. In the example set forth in FIG. 2, network 120 is the Internet. Mobile communication interface 110 operates as a web browser. LIPSGG identifier communication interface 114 operates as a web server.

A mobile user (not shown) directs camera 102 towards an object 122 (e.g., an MP3 player). Alternatively, the mobile user directs camera 102 towards a two-dimensional image of the object (e.g., an image of the MP3 player at a catalog). Camera 102 acquires one or more images (not shown) of one or more portions of object 122.

Alternatively, camera 102 is replaced with an image source 102. The image of the object is obtained from any image source known in the art, such as an image database, a memory unit, a scanner, a web site, a camera, and the like. For example, when the user browses through a web site (e.g., an online catalog) and views an object of interest (e.g., an electric appliance), the user sends the image of the object to LIPSGG extraction processor 104 for the identification process to begin.

LIPSGG extraction processor 104 identifies a plurality of local interest points (not shown), in an image (not shown) of object 122, according to variation in the values of the pixels around the local interest points. LIPSGG extraction processor 104 defines a plurality of feature vectors, describing the variation in the pixel values in the local region surrounding each of the local interest points. LIPSGG extraction processor 104 defines the semi-global geometry of object 122, as the relative position of each of the local interest points, within the image of object 122.

LIPSGG extraction processor 104 extracts an LIPSGG model 124 from the image of object 122. LIPSGG extraction processor 104 transmits data respective of LIPSGG model 124 to LIPSGG identifier 112 via network 120. In the example set forth in FIG. 2, the data which LIPSGG extraction processor 104 transmits to LIPSGG identifier 112, respective of object 122, is acquired by camera 102, while the user is present in front of object 122.

Alternatively, LIPSGG extraction processor 104 can extract an LIPSGG model 124 from the image of object 122, even though the image of object 122 was acquired by a camera (not shown), other than camera 102, and at a previous point in time (e.g., the image of object 122 was acquired by scanning a consumer product catalog, and by transmitting the scanned image to LIPSGG extraction processor, 104 via mobile communication interface 110).

Thus, the identification process according to the disclosed technique, is independent of the source of the image of object 122. For example, a user employing a laptop computer for retrieving an image of the object from an image database, via a wireless network, thereby employing the system of the disclosed technique, in order to retrieve information related to the object.

Further alternatively, LIPSGG extraction processor 104 can be located within LIPSGG identifier 112. In this case, camera 102 is coupled with mobile processor 106. Camera 102 transmits the image of object 122 to LIPSGG identifier 112, via network 120, instead of data respective of LIPSGG model 124.

Image processor 116 compares the feature vectors of LIPSGG model 124, with the feature vectors of the models stored in database 118. Image processor 116 retrieves data respective of a plurality of models from database 118, according to a predetermined number of matches between the feature vectors of LIPSGG model 124, and the feature vectors of each of the models.

Image processor 116 compares the semi-global geometry of LIPSGG model 124 with the semi-global geometry of each of the retrieved models. Image processor 116 identifies object 122, according to a confidence level of the match between the local interest points and the semi-global geometry of the acquired image of object 122 (i.e., of LIPSGG model 124), and those stored in database 118 (i.e., the interest points and semi-global geometry of the retrieved models). Image processor 116 identifies object 122 as one of the objects, having their respective data stored on database 118.

It is noted, that in case image processor 116 reconstructs a 3D model, according to one of the retrieved models, image processor 116 compares the semi-global geometry of LIPSGG model 124, with the semi-global geometry of the reconstructed 3D model, as well as with the semi-global geometry of the retrieved models. This feature enables processor 116 to identify object 122 at a higher confidence level.

It is noted, that it is imperative that the match values of the local interest points, and the semi-global geometry exceed a predetermined minimal value, in order to identify object 122 correctly. It is further noted, that the identification process of object 122 is two-dimensional rotation-invariant (i.e., independent of rotation), since the local interest points and their relative positions remain the same under one or more rotations.

It is noted, that the identification process according to the disclosed technique, is scale invariant (i.e., independent of the scale of the image of object 122, and not affected by the absolute distances between different interest points), and is a function of relative distances between interest points. Thus, LIPSGG identifier 112 can identify object 122 whether camera 102 acquires the image of object 122 from a position relatively close to object 122, or relatively far there from.

The identification process, according to the disclosed technique, is occlusion invariant (i.e., LIPSGG identifier can identify object 122 in case only a portion of object 122 is visible in the image of object 122, since the relative distances and angles between the visible interest points are substantially invariant). The identification process is also configuration invariant (i.e., in case object 122 is a multiple configuration object, LIPSGG identifier can identify object 122 in each configuration of object 122), since the relative distances and angles between the local interest points in each element, are substantially invariant.

It is further noted, that the identification process according to the disclosed technique, is color invariant, and is a function of variations in the pixel values. Thus, LIPSGG identifier 112 can identify object 122 whether camera 102 acquires a black and white image of object 122, a color image of object 122, or a color filtered image of object 122 (i.e., an image acquired by a camera with an assembled filter, blocking a partial range of light wavelengths). Alternatively, the identification process is color dependant (i.e., the pixel values corresponding to colors are defined in the feature vectors, and are employed during the identification process). For example, LIPSGG identifier 112 will identify a model of a red object, only in case the model of the red object is stored on database 118.

The identification process according to the disclosed technique, is three-dimensional substantially-small-angle rotation-invariant (i.e., affine invariance for angles small enough to negligibly affect the semi-global geometry). The three-dimensional substantially-small-angle rotations invariance is a function of the negligible affect of three-dimensional substantially-small-angle rotations on the planar angles and distances between interest points in the image of object 122.

According to another aspect of the disclosed technique, in case image processor 116 identifies object 122, as an object having its respective data stored on database 118, with a predetermined high match value, image processor 116 ads LIPSGG model 124 to database 118 as a new model, related to the identified object.

Image processor 116 retrieves general information related to object 122 from database 118. Image processor 116 transmits data respective of the general information related to object 122 to mobile processor 106 via LIPSGG identifier communication interface 114. Mobile processor 106 presents the data, respective of the general information, related to object 122, to the mobile user via user interface 108.

Figure 3:
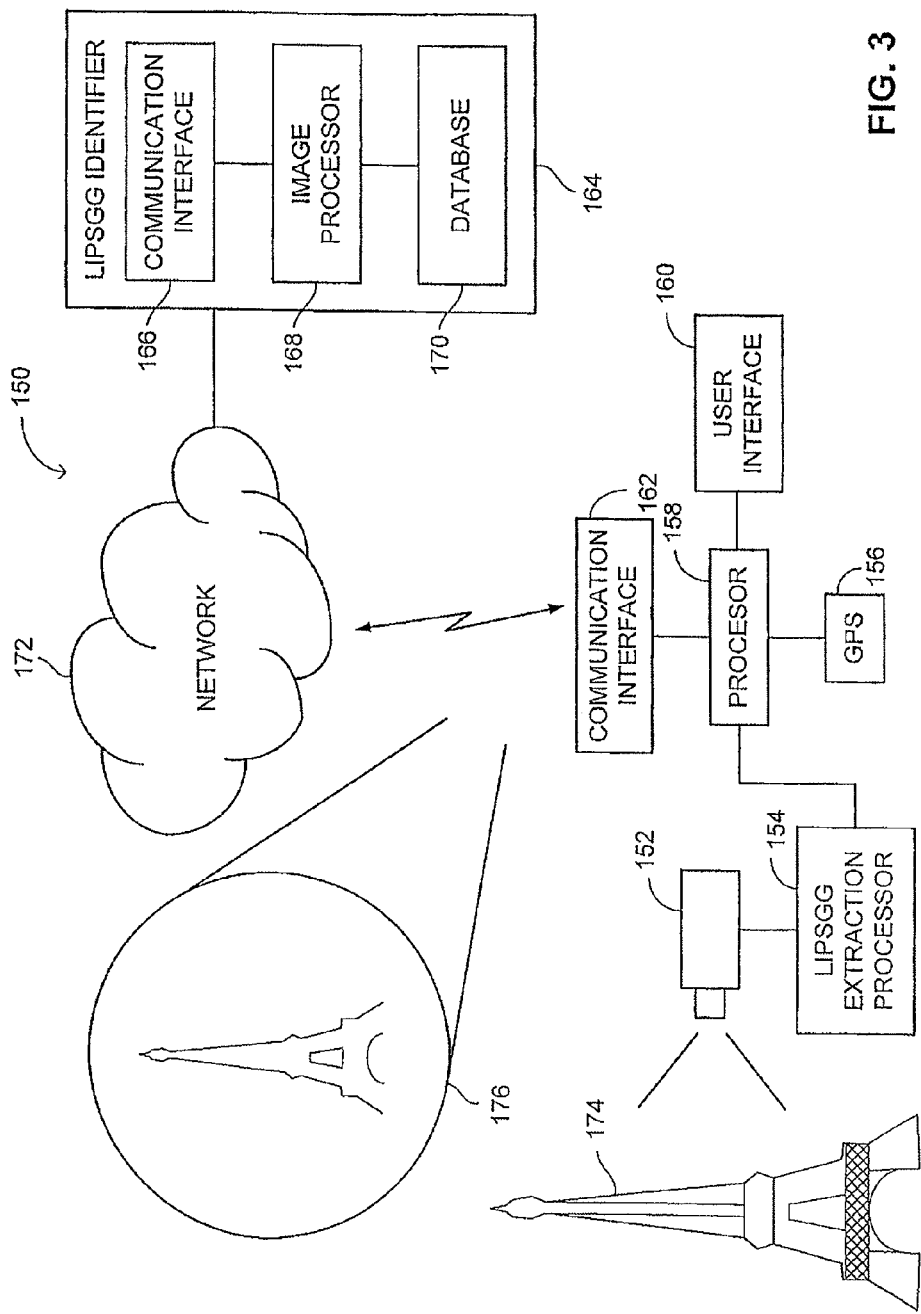
FIG. 3, is a schematic illustration of a system, for providing a mobile user, general information related to an object, constructed and operative in accordance with another embodiment of the disclosed technique; and, FIG. 4, is a schematic illustration of a method for operating the system of FIG. 2, operative in accordance with a further embodiment of the disclosed technique.

Reference is now made to FIG. 3, which is a schematic illustration of a system generally referenced 150, for providing a mobile user, general information related to an object, constructed and operative in accordance with another embodiment of the disclosed technique. System 150 includes a camera 152, a LIPSGG extraction processor 154, a GPS receiver 156, a mobile processor 158, a user interface 160, a mobile communication interface 162 and a LIPSGG identifier 164. LIPSGG identifier 164 includes an LIPSGG identifier communication interface 166, an image processor 168 and a database 170.

LIPSGG extraction processor 154, user interface 160, and database 170 are similar to LIPSGG extraction processor 104 (FIG. 2), user interface 108, and database 118, respectively, as described herein above. LIPSGG extraction processor 154 is coupled with camera 152. Mobile processor 158 is coupled with LIPSGG extraction processor 154, user interface 160, GPS receiver 156 and with mobile communication interface 162. Mobile communication interface 162 is coupled with LIPSGG identifier communication interface 166 via a network 172. Image processor 168 is coupled with LIPSGG identifier communication interface 166 and with database 170. The mobile user directs camera 152 towards an object 174 (e.g., the Eiffel tower in Paris). Camera 152 acquires one or more images (not shown) of one or more portions of object 174. LIPSGG extraction processor 154 extracts an LIPSGG model 176 of the image of object 174. GPS receiver 156 obtains a set of GPS coordinates of object 174.

Mobile processor 158 transmits data respective of LIPSGG model 176 and of the set of GPS coordinates of object 174 to LIPSGG identifier 164 via network 172. Image processor 168 matches object 174 with an object from a plurality of objects of database 170, according to LIPSGG model 176 and according to the set of GPS coordinates of object 174. Image processor 168 retrieves general information related to object 174 from database 170. Image processor 168 transmits data respective of the general information related to object 174, to mobile processor 158, via LIPSGG identifier communication interface 166. Mobile processor 158 presents the general information, related to object 174, to the mobile user via user interface 160.

Figure 4:
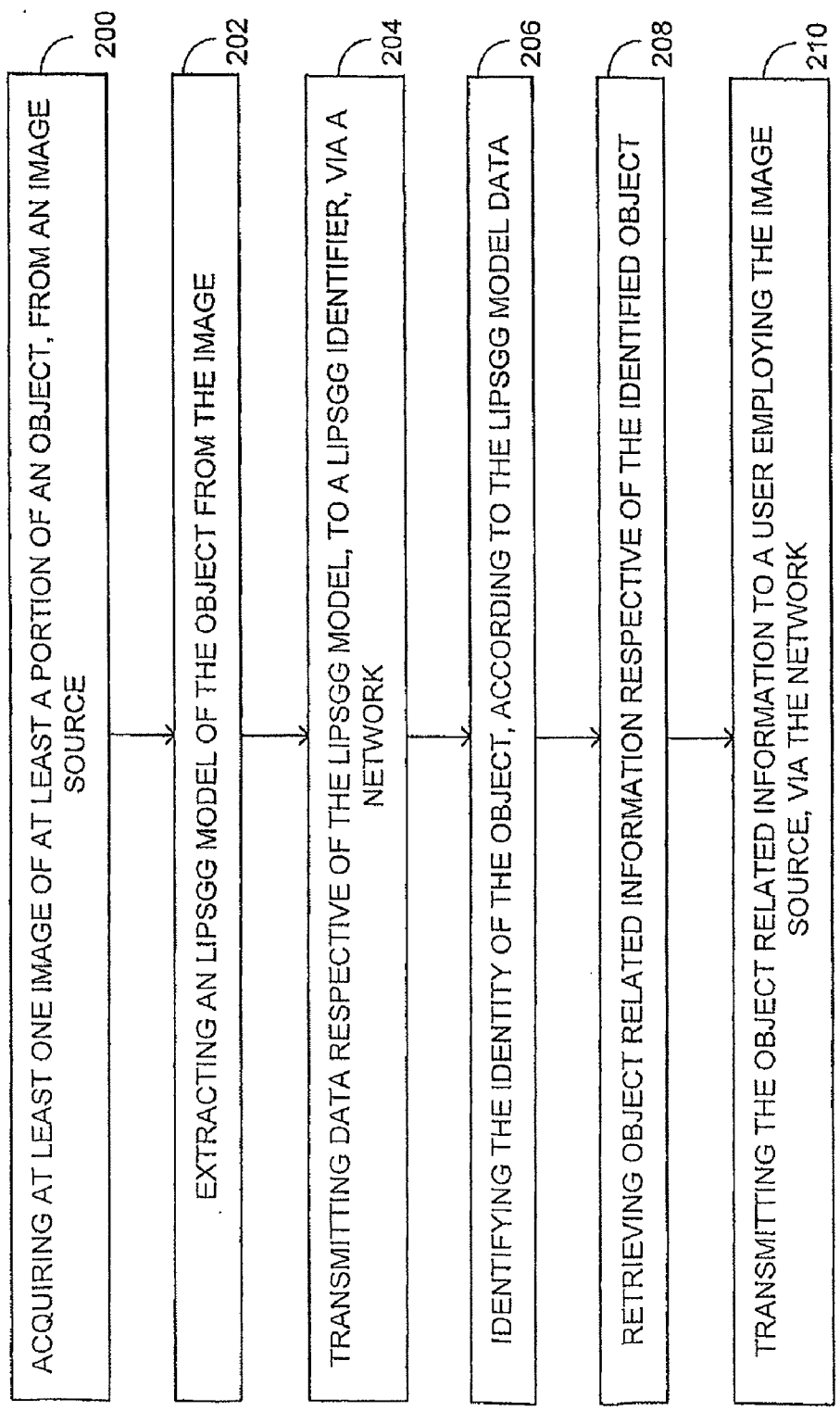

Reference is now made to FIG. 4, which is a schematic illustration of a method for operating the system of FIG. 2, operative in accordance with a further embodiment of the disclosed technique. In procedure 200, at least one image of at least a portion of an object, is acquired by an image source. With reference to FIG. 2, camera 102 acquires an image of object 122. Alternatively, an image source may include a terminal for retrieving an image of an object from a web site.

In procedure 202, an LIPSGG model of the object is extracted from the image. With reference to FIG. 2, LIPSGG extraction processor 104 extracts LIPSGG model 124 of object 122, from the image acquired in procedure 200.

In procedure 204, LIPSGG model data respective of the LIPSGG model, is transmitted to an LIPSGG identifier, via a network. With reference to FIG. 2, processor 106 transmits data respective of the LIPSGG model which extraction processor 104 extracted in procedure 202, to LIPSGG identifier 112, via communication interfaces 110 and 114, and network 120.

In procedure 206, the identity of the object is identified according to the LIPSGG model data. With reference to FIG. 2, image processor 116 identifies the identity of object 122, according to the data received from processor 106, respective of the LIPSGG model of object 122, in procedure 204, by employing database 118.

In procedure 208, object related information respective of the identified object, is retrieved. With reference to FIG. 2, image processor 116 retrieves information related to object 122, from database 118.

In procedure 210, the object related information is transmitted to a user operating the camera, via the network. With reference to FIG. 2, image processor 116 transmits the object related information, which was retrieved from database 118 in procedure 208, to processor 106, via communication interfaces 114 and 110, and network 120. Processor 106 provides the object related information to user interface 108 (e.g., a display of camera 102), for the display to display the object related information. Alternatively, image processor 116 transmits the object related information, which was retrieved from database 118 in procedure 208, to a computer station, the user is currently employing.

It will be appreciated by persons skilled in the art that the disclosed technique is not limited to what has been particularly shown and described hereinabove. Rather the scope of the disclosed technique is defined only by the claims, which follow.

The invention claimed is:

1. System for providing a mobile user, object related information related to an object visible thereto, the system comprising:
   an image source, said image source including at least one image of at least a portion of said object;
   a local-interest-points and semi-global geometry (LIPSGG) extraction processor coupled with said image source, said LIPSGG extraction processor extracting an LIPSGG model of said object from said at least one image, said LIPSGG model including data respective of a plurality of feature vectors of said object and respective of semi-global geometry of said object, each of said feature vectors determining variations in a plurality of pixel values at a region surrounding a local-interest-point of said object, said semi-global geometry determining a plurality of relative distances and a plurality of relative angles between the local-interest-points of said object; and
   a remote LIPSGG identifier, coupled with said LIPSGG extraction processor via a network, said remote LIPSGG identifier receiving said LIPSGG model from said LIPSGG extraction processor via said network, said remote LIPSGG identifier identifying said object according to said LIPSGG model, said remote LIPSGG identifier retrieving said object related information, said remote LIPSGG identifier providing said object related information to said mobile user.

2. The system of claim 1, wherein said image source is a camera, directable toward said object, said camera acquiring said at least one image of at least a portion of said object.

3. The system according to claim 1, wherein said network is selected from the list consisting of:
   wired network; and
   wireless network.

4. The system according to claim 1, wherein said network includes links selected from the list consisting of:
   wired internet;
   Wi-Fi;
   WiMax;
   Zigbee;
   Bluetooth;
   Cellular;
   free air optic;
   satellite; and
   wireless Internet.

5. The system according to claim 1, wherein said remote LIPSGG identifier comprises a database, and wherein said database includes data respective of a plurality of LIPSGG models of each of a plurality of objects, and respective of said object related information.

6. The system according to claim 5, wherein said remote LIPSGG identifier further comprises an image processor, and wherein said image processor identifies said object, according to said LIPSGG model and said LIPSGG models.

7. The system according to claim 1, further comprising:
   a mobile processor, coupled with said LIPSGG extraction processor; and
   a user interface, coupled with said mobile processor,
   wherein said mobile processor directs said user interface to present said object related information, to said mobile user.

8. The system according to claim 1, further comprising a Global Positioning System (GPS) receiver, coupled with said LIPSGG extraction processor,
   wherein said GPS receiver determines a set of GPS coordinates of said object, and
   wherein said remote LIPSGG identifier identifies said object according to said LIPSGG model and according to said set of GPS coordinates of said object.

9. System for providing a mobile user, object related information related to an object visible thereto, the system comprising:
   an image source, said image source including at least one image of at least a portion of said object;
   a local-interest-points and semi-global geometry (LIPSGG) extraction processor, coupled with said image source, for extracting an LIPSGG model of said object from said at least one image, said LIPSGG model including data respective of a plurality of feature vectors of said object and respective of semi-global geometry of said object, each of said feature vectors determining variations in a plurality of pixel values at a region surrounding a local-interest-point of said object, said semi-global geometry determining a plurality of relative distances and a plurality of relative angles between the local-interest-points of said object; and
   a mobile communication interface coupled with said LIPSGG extraction processor,
   wherein said mobile communication interface transmits said LIPSGG model to a remote LIPSGG identifier via a network, and
   wherein said mobile communication interface receives said object related information from said remote LIPSGG identifier.

10. System for providing a mobile user, object related information related to an object visible thereto, the system comprising:
    a remote local-interest-points and semi-global geometry (LIPSGG) identifier, said remote LIPSGG identifier including:
       a remote LIPSGG identifier communication interface for receiving at least one image of at least a portion of said object; and
       an LIPSGG extraction processor for extracting an LIPSGG model from said at least one image, said LIPSGG model including data respective of a plurality of feature vectors of said object and respective of semi-global geometry of said object, each of said feature vectors determining variations in a plurality of pixel values at a region surrounding a local-interest-point of said object, said semi-global geometry determining a plurality of relative distances and a plurality of relative angles between the local-interest-points of said object;
    wherein said remote LIPSGG identifier identifies said object, according to said LIPSGG model, and retrieves said object related information, and
    wherein said remote LIPSGG identifier communication interface transmits said object related information to said mobile user via a network.

11. Method for providing a mobile user, object related information related to an object visible thereto, the method comprising the procedures of:
    extracting an LIPSGG model, of said object, from at least one image, of at least a portion of said object, said LIPSGG model including data respective of a plurality of feature vectors of said object and respective of semi-global geometry of said object, each of said feature vectors determining variations in a plurality of pixel values at a region surrounding a local-interest-point of said object, said semi-global geometry determining a plurality of relative distances and a plurality of relative angles between the local-interest-points of said object;

transmitting LIPSGG model data, respective of said LIPSGG model, to an LIPSGG identifier via a network;

identifying said object, according to said LIPSGG model data;

retrieving said object related information, respective of said object, from a database; and transmitting said object related information, to said mobile user, via said network.

12. The method according to claim 11, further comprising the preliminary procedure of acquiring said at least one image.

13. The method according to claim 11, further comprising the procedure of storing said LIPSGG model data in said database, after performing said procedure of identifying.

14. The method according to claim 11, further comprising the procedure of reconstructing a three-dimensional LIPSGG model data in said database, after performing said procedure of two-dimensional LIPSGG models.

15. The method according to claim 11, further comprising the procedures of:

acquiring a set of GPS coordinates, respective of the location of said object;

transmitting data respective of said set of GPS coordinates to said LIPSGG identifier, via said network; and identifying said object, according to said set of GPS coordinates.

16. The system according to claim 2, wherein said camera acquires said at least one image on a medium selected from the list consisting of:

light-sensitive material;

charge-coupled device; and complementary metal oxide semiconductor.

* * * * *